United States Patent
Tu

(10) Patent No.: US 8,865,813 B2
(45) Date of Patent: Oct. 21, 2014

(54) COATING COMPOSITION CAPABLE OF FORMING A CRYSTAL-LIKE STEREO-PATTERN AND METAL PRODUCT HAVING THE CRYSTAL-LIKE STEREO-PATTERN FORMED THEREON

(75) Inventor: Chia-Lun Tu, Kaohsiung (TW)

(73) Assignee: Yung Chi Paint & Varnish Mfg. Co., Ltd., Kaohsiung (TW)

( * ) Notice: Subject to any disclaimer, the term of this patent is extended or adjusted under 35 U.S.C. 154(b) by 422 days.

(21) Appl. No.: 13/082,032

(22) Filed: Apr. 7, 2011

(65) Prior Publication Data

US 2012/0076988 A1    Mar. 29, 2012

(51) Int. Cl.
| | |
|---|---|
| C08K 5/07 | (2006.01) |
| C09D 7/00 | (2006.01) |
| C09D 167/00 | (2006.01) |
| C09D 5/28 | (2006.01) |
| C08K 5/3492 | (2006.01) |
| C08K 5/42 | (2006.01) |
| C08K 5/00 | (2006.01) |
| C08K 5/17 | (2006.01) |

(52) U.S. Cl.
CPC .............. *C09D 167/00* (2013.01); *C09D 7/001* (2013.01); *C08K 5/34922* (2013.01); *C08K 5/42* (2013.01); *C08K 5/0008* (2013.01); *C08K 5/17* (2013.01); *C09D 5/28* (2013.01)
USPC .......................... 524/360; 524/484; 524/487

(58) Field of Classification Search
USPC ......................... 524/487, 360, 484
See application file for complete search history.

(56) References Cited

U.S. PATENT DOCUMENTS 7,247,668 B2    7/2007 Tu

FOREIGN PATENT DOCUMENTS

| EP | 0 778 326 A2 | 6/1997 |
|---|---|---|
| TW | 593594 B | 6/2004 |

OTHER PUBLICATIONS

Search Report for Taiwanese Application No. 099132172; dated Jul. 3, 2013.

*Primary Examiner* — Edward Cain
(74) *Attorney, Agent, or Firm* — Alston & Bird LLP

(57) ABSTRACT

A coating composition capable of forming a crystal-like stereo-pattern includes: a polyester; a curing agent for curing the polyester; a curing catalyst mixture including at least two curing catalysts to provide different curing rates for curing the polyester; a composite solvent including at least two solvents having different dissolving powers for the polyester; and a wax incompatible with the polyester. A metal product having the stereo-pattern formed thereon is also disclosed.

14 Claims, 2 Drawing Sheets

COATING COMPOSITION CAPABLE OF FORMING A CRYSTAL-LIKE STEREO-PATTERN AND METAL PRODUCT HAVING THE CRYSTAL-LIKE STEREO-PATTERN FORMED THEREON

BACKGROUND OF THE INVENTION

1. Field of the Invention

This invention relates to a coating composition capable of forming a stereo-pattern and a metal product having the stereo-pattern formed thereon, more particularly to a coating composition capable of forming a crystal-like stereo-pattern and a metal product having the crystal-like stereo-pattern formed thereon.

2. Description of the Related Art

In the past, a metal plate or a metal product having a stereo-pattern is usually prepared by applying a coating of polyvinyl chloride (PVC) to a metal surface of the metal plate or metal product, hot-pressing the coating using an embossing roller, and quenching the coating to form the stereo-pattern. However, the stereo-pattern formed of the PVC coating has poor weather resistance and typically includes a plasticizer that is prone to migration and to cause environmental pollution. Thus, the use of such PVC coating is regulated or forbidden in many countries.

In U.S. Pat. No. 7,247,668 owned by the applicant of this invention, there is disclosed a curable coating composition capable of forming an embossment-like texture (see FIG. 1). The curable coating composition includes a polyester as a main component, a curing agent, a curing catalyst, a composite solvent, and a wax. The composite solvent has at least two solvents having different dissolving powers for the polyester. The wax is incompatible with the polyester. The technical features disclosed in U.S. Pat. No. 7,247,668 reside in forming the embossment-like pattern using the composite solvent and the wax.

SUMMARY OF THE INVENTION

An object of the present invention is to provide a coating composition capable of forming a crystal-like stereo-pattern and a metal product having the crystal-like stereo-pattern formed thereon that can overcome the aforesaid drawbacks associated with the pattern of the prior art and provide a pattern type different from that of the prior art.

According to one aspect of this invention, there is provided a coating composition capable of forming a crystal-like stereo-pattern, comprising:

a polyester;

a curing agent for curing the polyester;

a curing catalyst mixture including at least two curing catalysts to provide different curing rates for curing the polyester;

a composite solvent including at least two solvents having different dissolving powers for the polyester; and a wax incompatible with the polyester.

According to another aspect of this invention, there is provided a metal product comprising:

a metal body; and a coating layer disposed on the metal body and including a base film formed on the metal body, and a top film having a crystal-like stereo-pattern and formed on the base film, the top film being made of the coating composition of this invention.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
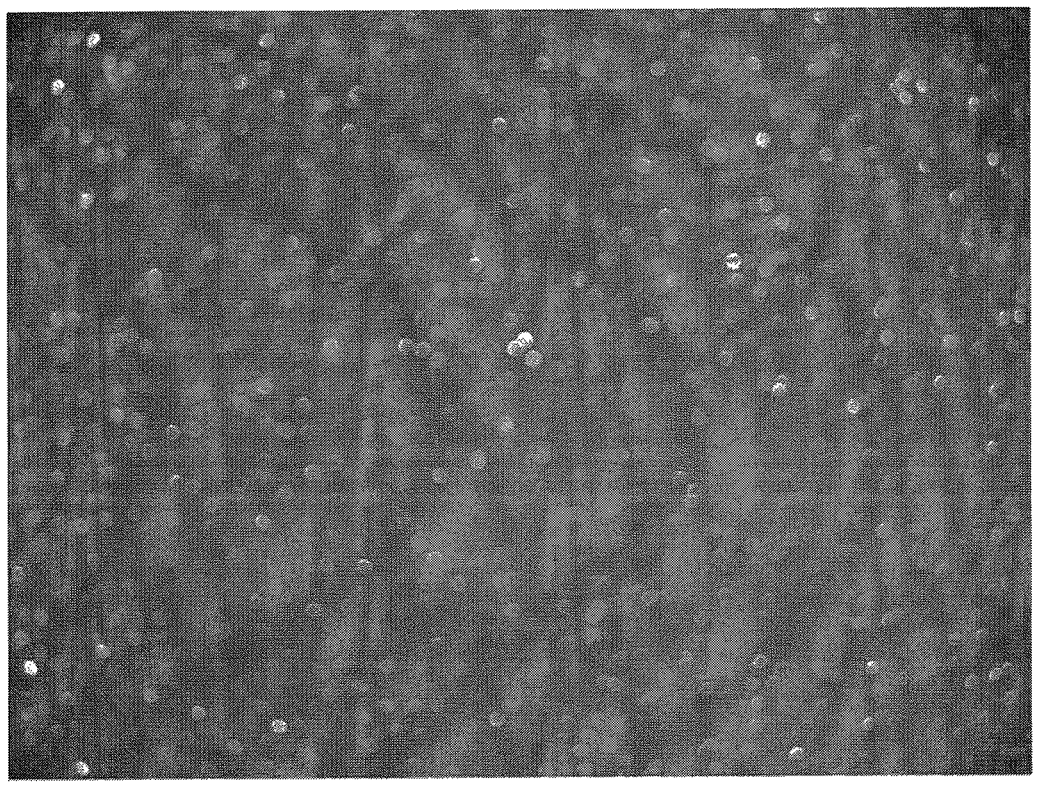
FIG. 1 is a microscopic photograph of the embossment-like texture of the metal product disclosed in U.S. Pat. No. 7,247,668.

The preferred embodiment of a coating composition capable of forming a crystal-like stereo-pattern according to the present invention comprises: a polyester as a base component, a curing agent for curing the polyester, a curing catalyst mixture, a composite solvent, and a wax incompatible with the polyester. The curing catalyst mixture includes at least two curing catalysts to provide different curing rates for curing the polyester. The composite solvent includes at least two solvents having different dissolving powers for the polyester.

The coating composition of the present invention is capable of forming a crystal-like stereo-pattern having an even color based on the following two hypotheses:

(1) In the curing catalyst mixture, at least one curing catalyst is able to accelerate the curing rate of the polyester, and at least another curing catalyst is able to catalyze curing of the polyester at a rate slower than that of the at least one curing catalyst.

(2) Since the composite solvent includes at least two solvents having different dissolving powers for the polyester, and since the wax is incompatible with the polyester, the coating composition of this invention cannot be completely leveled on a surface. That is to say, a film formed on the surface using the coating composition has an uneven thickness.

Accordingly, when the coating composition is coated on the surface of an article, such as a metal body, to form a top film and is subsequently cured, an outer surface and an inner portion of the top film are cured and dried at different rates due to the hypothesis (1). Furthermore, the top film that has the uneven thickness can be cured to form the crystal-like stereo-pattern due to the hypothesis (2).

Preferably, the curing catalyst mixture includes first and second curing catalysts. The first curing catalyst provides a curing rate faster than that of the second curing catalyst.

Preferably, the weight ratio of the first and second curing catalysts ranges from 1:0.6 to 1:3.

More preferably, the first curing catalyst is a primary amine, and the second curing catalyst is a weak acid.

The weak acid may be a substituted sulfonic acid, and more preferably p-toluene sulfonic acid (PTSA), dinonanyl sulfonic acid (DNNSA), or a combination thereof. In an embodiment of the coating composition of this invention, the weak acid is PTSA.

The primary amine may be dimethyl ethylamine (DMEA) or triethylamine (TEA). In an embodiment of the coating composition of this invention, the primary amine is DMEA.

In the preferred embodiment, the base component of the coating composition further includes a polymer, which is selected from acrylic resin and alkyd resin.

Preferably, the polyester included in the base component has a weight average molecular weight ranging from 2000 to 15000, a hydroxyl value ranging from 5 to 50, and an acid value of less than 20. More preferably, the hydroxyl value of the polyester is less than 10.

Preferably, the composite solvent includes an aromatic solvent, and one of a cyclic ketone and an ester. The cyclic ketone and the ester serve as the solvents for dissolving the base component, while the aromatic solvent serves as a diluent. For example, the cyclic ketone may be, but is not limited to, cyclohexanone, and the ester may be, but is not limited to, dibasic ester (DBE) or propylene glycol methyl ether acetate (e.g., PMA commercially available from Dow Chemical company, or PCA commercially available from Arco Chemical company). The aromatic solvent may be, but is not limited to, a $C_9$-$C_{12}$ aromatic hydrocarbon having a boiling point ranging from 100° C. to 250° C. (e.g., S100 commercially available from Chinese Petroleum Corporation), a $C_9$-$C_{12}$ aromatic hydrocarbon having a boiling point ranging from 192° C. to 207° C. (e.g., S150 commercially available from Chinese Petroleum Corporation), or a $C_9$-$C_{12}$ aromatic hydrocarbon having a boiling point ranging from 226° C. to 285° C. (e.g., S200 commercially available from Chinese Petroleum Corporation). In an embodiment of the coating composition of this invention, the composite solvent includes DBE and S150.

Preferably, the weight ratio of the cyclic ketone (or the ester) to the aromatic solvent ranges from 5:1 to 1:5.

The curing agent is selected from polyamine, isocyanate, or a combination thereof. The polyamine may be, but is not limited to, melamine. In an embodiment of the coating composition of this invention, the curing agent is melamine.

The wax is polyethylene wax, polypropylene wax, natural wax, or combinations thereof.

Preferably, based on 100 parts by weight of the base component, the amount of the curing agent ranges from 10 to 40 parts by weight, the amount of the curing catalyst mixture ranges from 1 to 10 parts by weight, the amount of the composite solvent ranges from 20 to 30 parts by weight, and the amount of the wax ranges from 0.1 to 2.0 parts by weight.

In the coating composition of the present invention, each component of the coating composition (such as the curing catalyst mixture and the wax), the amount of each component, and the thickness of the coating composition coated on the metal product may be varied based on the requirements for obtaining the intended crystal-like stereo-patterns on a metal body or metal product.

The coating composition further includes a functional additive, such as a dispersing agent, a thixotropic agent, a matting agent, a defoaming agent, a leveling agent, etc.

The coating composition may be prepared using any known methods in the relevant art.

A metal product according to the present invention may be formed using any known methods in the relevant art. For example, a base film is formed on a metal body, followed by forming a top film on the base film to form a coating layer having the base film and the top film on the metal body. The top film is formed by coating the coating composition on the base film, and subsequently curing the coating composition. Preferably, the coating composition is cured at a temperature ranging from 200° C. to 250° C. for 20 seconds to 5 minutes.

The metal body is preferably a metal sheet selected from a steel plate, a galvanized steel plate, an Al—Zn coated steel plate, and a stainless steel plate. In an embodiment of the coating composition of this invention, the metal body is an Al—Zn coated steel plate.

Preferably, the base film is formed from a coating material, which includes at least one polymer selected from polyester, polyurethane, and epoxy resin. More preferably, the coating material includes polyester as a main material, in which the polyester has a weight average molecular weight ranging from 10000 to 40000, a hydroxyl value ranging from 10 to 50, and an acid value of less than 5.

Preferably, the coating material for forming the base film further includes a curing agent, a curing catalyst, and a solvent. Examples of the curing agent include methylated polyamine and isocyanate. Examples of the curing catalyst include dibutyltin laurate (DBTM) and PTSA. DBTM may be used for improving the reactivity of isocyanate. PTSA may be used for improving the reactivity of methylated polyamine and for reducing the curing temperature. The solvent may be composed of a single-component solvent or a combination of two or more solvents and may be selected from at least one of an aromatic solvent, ketone, ester, etc. Based on color or stability requirements, the coating material may further include an anticorrosive pigment.

Preferably, the thickness of the coating layer is less than 45 μm, and the thickness of the base film ranges from 3 μm to 20 μm.

With the crystal-like stereo-pattern (the top film) of the metal product, the metal product is not only protected from corrosion, but the top film of the metal product has mechanical properties and weather and chemical resistances required by commercial uses.

The present invention is explained in more detail below by way of the following examples. It should be noted that the examples are only for illustration and not for limiting the scope of the present invention.

Examples

<Preparation of the Coating Composition>

The components and the amounts thereof listed in Table 1 were blended to preparing the coating composition for each of Examples 1 to 5. The base component is polyester available from Yung Chi Paint & Varnish MFG. Co., Ltd. (brand name: YCP-1412). The curing agent is melamine. The curing catalyst mixture includes PTSA and DMEA in a weight ratio of 1:1. The composite solvent includes DBE and S150 in a weight ratio of 1:1. The wax is polypropylene wax. Functional additives were also added as listed in Table 1.

TABLE 1

| Components (Parts by weight) | Ex 1 | Ex 2 | Ex 3 | Ex 4 | Ex 5 |
| --- | --- | --- | --- | --- | --- |
| Polyester | 100 | 100 | 100 | 100 | 100 |
| Curing agent | 14 | 20 | 30 | 30 | 38 |
| Curing catalyst mixture | 4 | 4 | 5 | 5 | 6 |
| Composite solvent | 21 | 20 | 22 | 23 | 25 |
| Wax | 1 | 0.2 | 0.5 | 1.5 | 2.0 |
| Titanium white powder | 60 | 10 | 0 | 0 | 5 |
| Pigment | 0 | 15 | 40 | 30 | 20 |
| Antioxidant | 2 | 0 | 0 | 0 | 0 |
| Thixotropic agent | 2 | 2 | 0 | 0 | 0 |
| Dispersing agent | 2 | 2 | 3 | 5 | 5 |
| Defoaming agent | 2 | 2 | 2 | 2 | 2 |
| Leveling agent | 2 | 2 | 2 | 2 | 2 |

<Preparation of the Metal Product>

First, the coating material for forming the base film was prepared by blending 100 parts by weight of polyester (brand name: HW-502, available from Yung Chi Paint & Varnish MFG. Co., Ltd.), 15 parts by weight of a curing agent (including methylated polyamine and isocyanate, the weight ratio of the methylated polyamine and isocyanate being 1:1), 8 parts by weight of a curing catalyst (including DBTM and PTSA, the weight ratio of DBTM and PTSA being 1:1), 30 parts by weight of a solvent (including DBE and S150, the weight ratio of DBE and S150 being 1:1), 30 parts by weight of titanium white powder, 10 parts by weight of an anticorrosive pigment, 2 parts by weight of a thixotropic agent, 2 parts by weight of a defoaming agent, and 2 parts by weight of a leveling agent. Then, the coating material was applied on an Al—Zn coated steel plate (i.e., the metal body) having a thickness of 0.426 mm to form the base film of 10 μm thickness. Thereafter, the coating composition prepared previously was applied on the base film to form the top film that is 25 μm thick. Finally, the base and top films formed on the metal body were cured at 230° C. for 30 seconds to obtain the metal product having the crystal-like stereo-pattern formed thereon.

<Test>

1. Appearance

Figure 2:
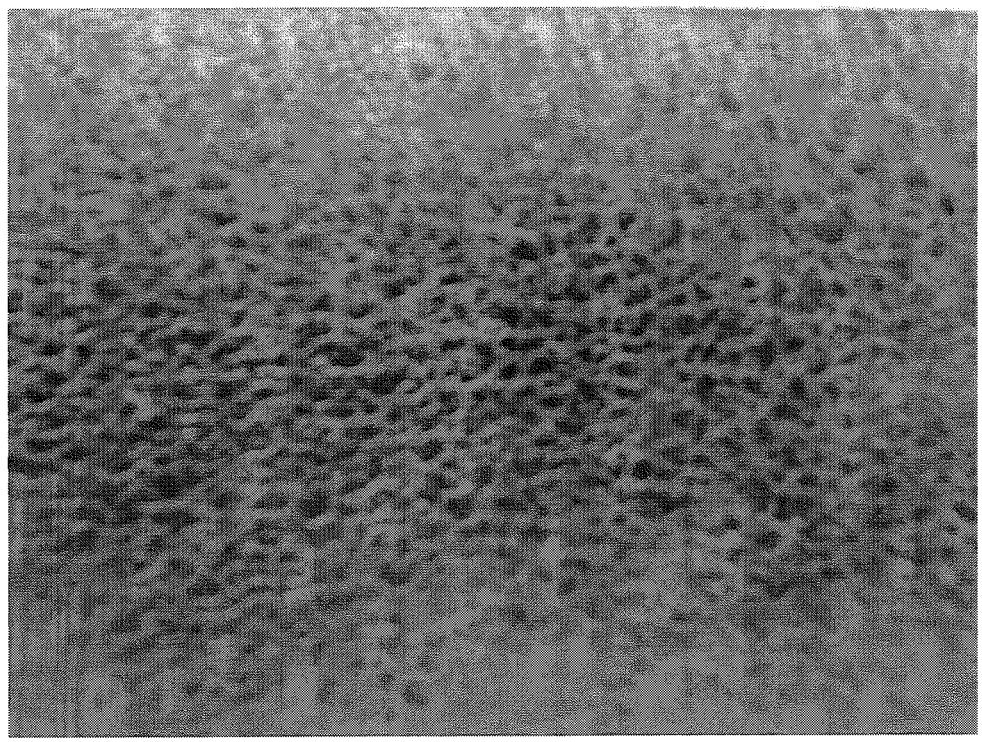
FIG. 2 is a microscopic photograph of the preferred embodiment of a crystal-like stereo-pattern of a metal product according to the present invention.

A microscopic photograph of the metal product of Example 1 is shown in FIG. 2. In FIG. 2, the metal product of this invention has a more uniform color than that of FIG. 1, and is formed with the crystal-like stereo-pattern different from the embossment-like pattern of FIG. 1.

Accordingly, this demonstrates that the appearances of the metal product of the present invention (FIG. 2) and the metal plate disclosed in U.S. Pat. No. 7,247,668 (FIG. 1) are totally different.

2. Physical Property

The physical properties of the top film of the metal product (Example 1) are shown in Table 2.

TABLE 2

| Test item | | Measuring methods | Evaluation | Result |
|---|---|---|---|---|
| T-BEND/Adhesion | | ASTM 4145 | Tape off | 0T |
| Pressure Test | 6 mm Tape Adhesion | Alison Tester | Cracking Tape off | No No |
| Impact Resistance | 1 Kg × 50 cm Tape Adhesion | ASTM D2794 | Creaking Tape off | No No |
| Pencil Hardness | | ASTM D3363 | Scratch | 3H(no) |
| Gloss | | ASTM D623 | 60° | <10% |
| Chemical Resistance (24° C., 24 hr) | 5% NaOH | ASTM D1308 | Blister | No |
| Solvent Resistance MEK (times) | | ASTM D5402 | Double rubbing | 50 Times |
| Moisture Resistance | Edge | JIS K 5600 | Edge corrosion | 0 mm |
| | Flat | | Surface condition blistering | No |
| | Scribe | | Scribe corrosion | 0 mm |
| Salt Spray Test | Edge | ASTM B117 | Edge corrosion | 2 mm |
| | Flat | | Surface condition blistering | No |
| | Scribe | | Scribe corrosion | 0 mm |
| Surface condition | | | | Coarse Crystal grain |
| Abrasion Resistance | | | | Excellent |
| 2 hr Boiling | Blister | | Blister | No |
| | Gloss | | 60° | <10% |
| | T-bend | | Tape off | No |

In view of the results shown in Table 2, the top film of the metal product formed of the coating composition according to this invention has mechanical properties and weather and chemical resistances sufficient to comply with commercial requirements, and is less susceptible to peel off.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

What is claimed is:

1. A coating composition capable of forming a crystal-like stereo-pattern, comprising:
    a polyester;
    a curing agent for curing said polyester;
    a curing catalyst mixture including at least two curing catalysts to provide different curing rates for curing said polyester;
    a composite solvent including at least two solvents having different dissolving powers for said polyester; and
    a wax incompatible with said polyester,
    wherein said curing catalyst mixture includes first and second curing catalysts, said first curing catalyst providing a curing rate faster than that of said second curing catalyst, and
    wherein said first curing catalyst is a primary amine, and said second curing catalyst is a weak acid.

2. The coating composition of claim 1, wherein said primary amine is one of dimethyl ethylamine and triethylamine.

3. The coating composition of claim 1, wherein said weak acid is a substituted sulfonic acid.

4. The coating composition of claim 1, wherein said composite solvent includes an aromatic solvent, and one of a cyclic ketone and an ester.

5. The coating composition of claim 4, wherein said aromatic solvent is selected from the group consisting of a C9-C12 aromatic hydrocarbon having a boiling point ranging from 100° C. to 250° C., a C9-C12 aromatic hydrocarbon having a boiling point ranging from 192° C. to 207° C., a C9-C12 aromatic hydrocarbon having a boiling point ranging from 226° C. to 285° C., and combinations thereof.

6. The coating composition of claim 1, wherein said curing agent is selected from the group consisting of polyamine, isocyanate, and a combination thereof.

7. The coating composition of claim 1, wherein said polyester has a weight average molecular weight ranging from 2000 to 15000, a hydroxyl value ranging from 5 to 50, and an acid value of less than 10.

8. The coating composition of claim 1, wherein said composite solvent includes an aromatic solvent selected from the group consisting of a C9-C12 aromatic hydrocarbon having a boiling point ranging from 100° C. to 250° C., a C9-C12 aromatic hydrocarbon having a boiling point ranging from 192° C. to 207° C., a C9-C12 aromatic hydrocarbon having a boiling point ranging from 226° C. to 285° C., and combinations thereof.

9. The coating composition of claim 1, wherein said composite solvent includes an aromatic solvent selected from the group consisting of a C9-C12 aromatic hydrocarbon having a boiling point ranging from 192° C. to 207° C., a C9-C12 aromatic hydrocarbon having a boiling point ranging from 226° C. to 285° C., and combinations thereof.

10. The coating composition of claim 1, wherein said composite solvent includes an aromatic solvent, wherein the aromatic solvent is a C9-C12 aromatic hydrocarbon having a boiling point ranging from 192° C. to 207° C.

11. The coating composition of claim 1, wherein said composite solvent includes an aromatic solvent, wherein the aromatic solvent is a C9-C12 aromatic hydrocarbon having a boiling point ranging from 226° C. to 285° C.

12. The coating composition of claim 1, wherein said primary amine is dimethyl ethylamine.

13. The coating composition of claim 1, wherein said primary amine is triethylamine.

14. A coating composition comprising:
a polyester;
a curing agent for curing said polyester;
a curing catalyst mixture including at least two curing catalysts to provide different curing rates for curing said polyester;
a composite solvent including at least two solvents having different dissolving powers for said polyester; and
a wax incompatible with said polyester,
wherein said curing catalyst mixture includes first and second curing catalysts, said first curing catalyst providing a curing rate faster than that of said second curing catalyst, and
wherein said first curing catalyst is a primary amine, and said second curing catalyst is a weak acid.

* * * * *